United States Patent [19]

Anderson et al.

[11] Patent Number: 4,497,618
[45] Date of Patent: Feb. 5, 1985

[54] COMBINED VACUUM PUMP AND POWER STEERING PUMP ASSEMBLY

[75] Inventors: Stanley E. Anderson, Saginaw; Gary G. Hegler, Chesaning, both of Mich.

[73] Assignee: General Motors Corporation, Detroit, Mich.

[21] Appl. No.: 530,951

[22] Filed: Sep. 12, 1983

[51] Int. Cl.³ .................. F04C 11/00; F04B 23/00; F04B 39/02
[52] U.S. Cl. .................. 418/212; 417/426; 417/368; 60/486; 418/88
[58] Field of Search .................. 417/2, 62, 199 R, 286, 417/287, 313, 321, 364, 368, 426; 60/484, 486; 123/195 A, 198 C; 418/212, 3, 88; 180/132; 303/10

[56] References Cited

U.S. PATENT DOCUMENTS

| 1,657,905 | 1/1928 | Smith | 417/426 X |
|---|---|---|---|
| 2,409,477 | 10/1946 | Lancey | 417/199 R X |
| 2,427,347 | 9/1947 | Bessy | 417/364 |
| 2,575,074 | 11/1951 | Senninger | 417/199 R |
| 2,655,110 | 10/1953 | Sanborn | 417/199 R |
| 2,766,693 | 10/1956 | Wells | 417/199 R X |
| 2,892,413 | 6/1959 | Erikson | 417/286 X |
| 2,921,528 | 1/1960 | Muller | 418/3 X |
| 2,935,023 | 5/1960 | Jackson et al. | 418/3 X |
| 3,037,455 | 6/1962 | Bozimowski et al. | 418/3 |
| 3,771,921 | 11/1973 | Rohde et al. | 417/426 X |
| 3,778,192 | 12/1973 | Caffrey | 417/426 X |
| 3,898,810 | 8/1975 | Ohba et al. | 60/484 X |

FOREIGN PATENT DOCUMENTS

| 152714 | 8/1953 | Australia | 418/3 |
|---|---|---|---|
| 216570 | 5/1924 | United Kingdom | 123/195 A |
| 2026612 | 2/1980 | United Kingdom | 418/3 |

Primary Examiner—William L. Freeh
Assistant Examiner—Paul F. Neils
Attorney, Agent, or Firm—R. L. Phillips

[57] ABSTRACT

A combined power steering pump and vacuum pump assembly is disclosed wherein a vented reservoir is connected to receive the discharge of the vacuum pump as well as supply the fluid for circulation by and lubrication of the power steering pump. A sealing arrangement seals the vacuum pump from the power steering pump when the pumps are stopped but provides limited delivery of the fluid from the power steering pump to the vacuum pump when the pumps are running whereby the fluid in the power steering system is prevented from draining into the vacuum pump when stopped and is delivered thereto when running to lubricate same and is then delivered with the discharge air to the reservoir so that there is no loss of the fluid from the power steering system in lubricating the vacuum pump.

2 Claims, 7 Drawing Figures

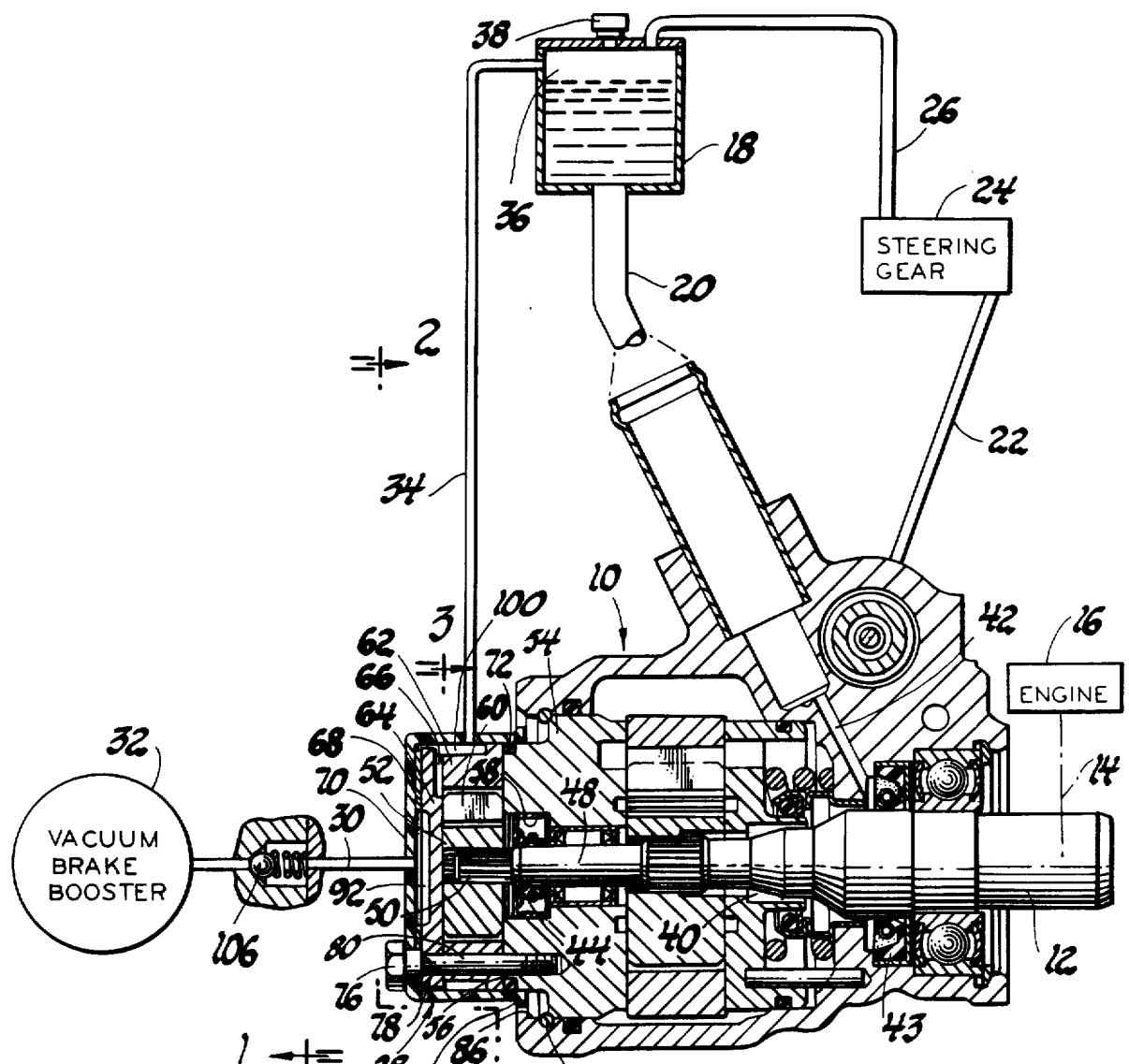

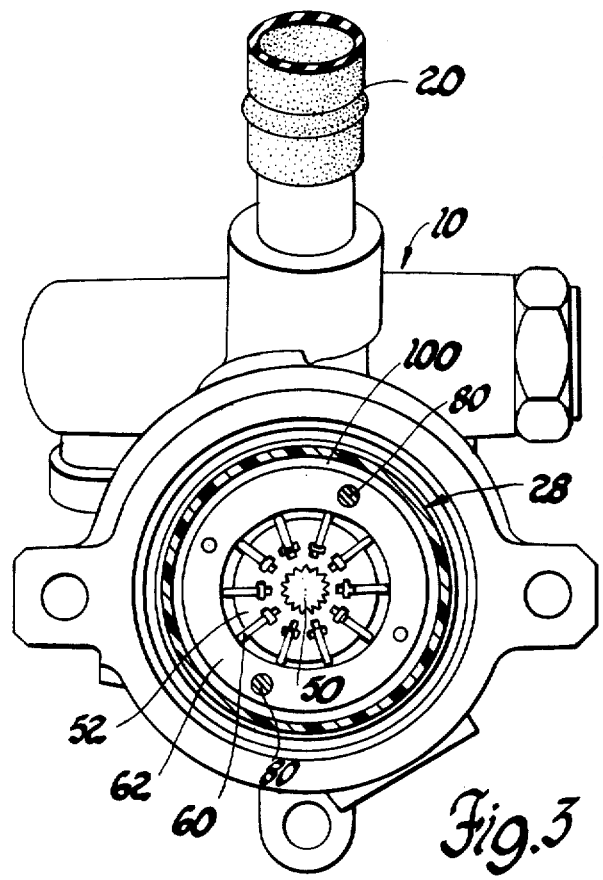
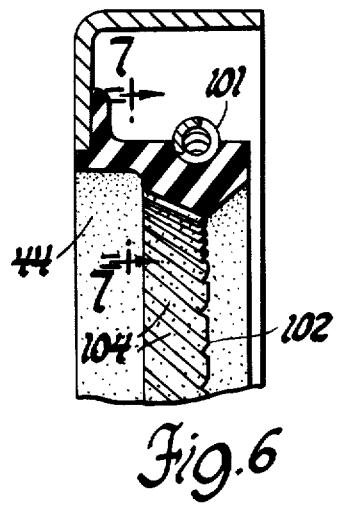
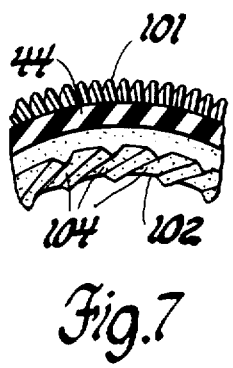
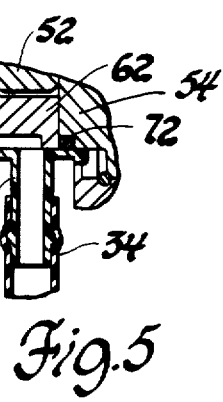
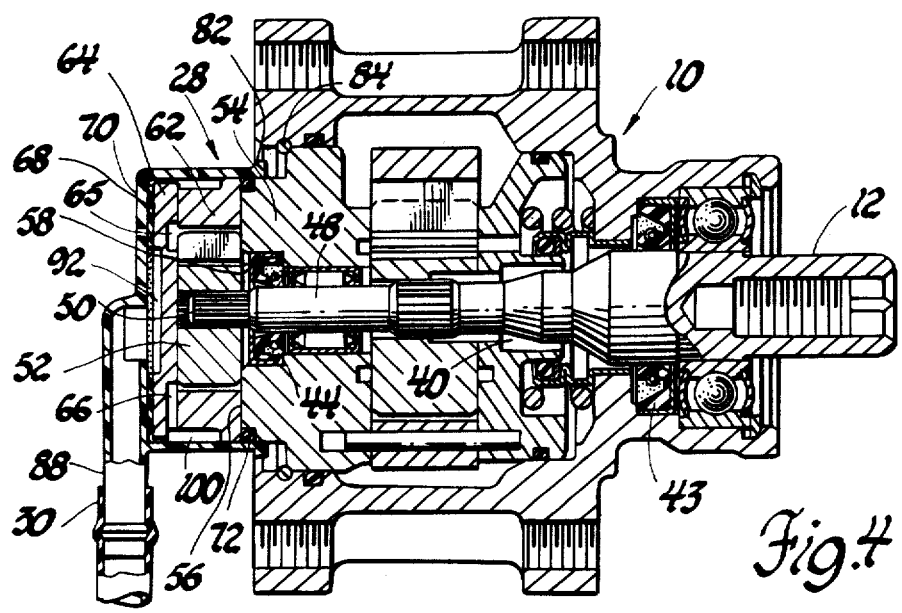

COMBINED VACUUM PUMP AND POWER STEERING PUMP ASSEMBLY

This invention relates to a combined vacuum pump and power steering pump assembly and more particularly to an improved lubrication system for the vacuum pump.

With the continuing demand in automotive vehicles for reduced exhaust emissions, there is the resultant loss in engine performance and the accompanying reduction in manifold vacuum that is used to assist in the operation of such devices as power brakes, EGR, cruise control and heating/cooling controls. To continue to meet their vacuum needs, it has been necessary with those engines lacking sufficient manifold vacuum capability to add an auxiliary vacuum pump that is typically either camshaft-driven, belt-driven or arm-actuated. These pumps must be packaged into the selected drive zone within the available underhood space and their operation consumes energy reducing the fuel economy as well as adding initial cost to the vehicle. So where the vehicle design goals include reduced weight, lower cost and greater fuel economy, the use of an auxiliary vacuum pump is avoided whenever possible.

The present invention is directed to providing a viable alternative where added vacuum capability is required by the combining of an auxiliary vacuum pump with a power steering pump so as to form a unit that with respect to the vacuum pump is readily installable, compact, lightweight, low cost and energy efficient. The broad idea of combining an air pump (vacuum or positive pressure) with a hydraulic pump is, of course, not new. However, there is in the case of adding a vacuum pump in tandem to a power steering pump in the pursuit of the above advantages the technical problems of maintaining their separate integrity while satisfying their separate requirements particularly as to lubrication of the vacuum pump. Preferably, the vacuum pump like the power steering pump is of the vane type and requires lubrication between its moving parts to reduce wear and heat as well as lubrication between mating surfaces to seal against vacuum loss. Rather than having a separate lubrication system with its attendant requirements, the present invention makes use of the hydraulic fluid in the power steering system in very advantageous manner while assuring that there is no permanent loss of same. This is accomplished in a compact arrangement wherein the two pumps are arranged in tandem and driven by a common drive shaft by having a single vented reservoir connected to receive the discharge of the vacuum pump as well as supply the hydraulic fluid for circulation in the power steering system by the power steering pump. A hydrodynamic lip-type seal is then provided about the drive shaft to statically seal the vacuum pump from the power steering pump when the pumps are stopped but is reversely ribbed so as to effect limited delivery of the steering system fluid to the vacuum pump when running. Fluid in the power steering system is thereby prevented from draining into the vacuum pump when stopped but is delivered thereto to lubricate same when running and is thence delivered with the vacuum pump discharge air back to the reservoir so that there is no permanent loss of fluid from the power steering system in lubricating the vacuum pump.

These and other features, advantages and objects of the present invention will become more apparent from the following description and drawings in which:

FIG. 1 is a cross-sectional elevational view taken along the line 1—1 in FIG. 2 of a combined vacuum pump and power steering pump assembly illustrating the preferred embodiment of the invention and includes diagrammatic representation of associated components.

FIG. 2 is an end elevational view taken along the line 2—2 in FIG. 1.

FIG. 3 is a cross-sectional view taken along the line 3—3 in FIG. 1.

FIG. 4 is a cross-sectional view taken along the line 4—4 in FIG. 2.

FIG. 5 is a cross-sectional view taken along the line 5—5 in FIG. 2.

FIG. 6 is an enlarged partial, longitudinal sectional view of the lip-type seal between the hydraulic pump and vacuum pump in FIG. 1.

FIG. 7 is a view taken along the line 7—7 in FIG. 6.

Referring to FIG. 1, there is shown an automotive power steering pump generally designated as 10, whose drive shaft 12 is driven through a belt drive 14 by an internal combustion engine 16. The power steering pump 10 is of the vane type and receives hydraulic fluid from an elevated reservoir 18 via a hose 20 and delivers same under pressure via a hose 22 to a power steering gear 24 from which the fluid is returned to the reservoir via a hose 26 to complete the power steering system circuit. According to the present invention, a vacuum pump 28 also preferably of the vane type is mounted in tandem on the back end of the power steering pump which apart from such adaptation is like that disclosed in U.S. Pat. No. 4,373,871 assigned to the assignee of the present invention and which is hereby incorporated by reference. As will become evident, the addition of the vacuum pump 28 to the power steering pump 10 in no way influences the normal function of the latter or the steering system it serves.

Describing then briefly the function of the vacuum system, air is drawn into the vacuum pump 28 through an inlet hose 30 from whatever device(s) it serves such as a vacuum brake booster 32. This air is then discharged from the vacuum pump through a discharge hose 34 into an air space 36 above the hydraulic fluid in the steering system reservoir 18, such air space being vented to atmosphere through a vented cap 38. For proper operation of the vane type vacuum pump 28, hydraulic lubrication is required for two reasons. Firstly, to provide basic lubrication between its moving parts to reduce wear and heat. Secondly, it is necessary to maintain a lubricant film between the vacuum pump's mating surfaces to perform a sealing function against vacuum loss. According to the present invention, such lubrication is obtained by use of the hydraulic fluid in the steering system while assuring against permanent loss thereof.

In the hydraulic circuit, fluid in the reservoir 18 passes through the intake hose 20 into the hydraulic pump 10 where a central core cavity 40 extending around the drive shaft 12 normally communicates with the inlet porting of the hydraulic pump via hole 42. The front end (right end) of the cavity 40 is sealed by a conventional lip-type shaft seal 43 which seals to shaft 12 while the other or left end of the cavity adjacent the vacuum pump 28 is closed by a special lip-type seal 44 which seals to the shaft 12 under static conditions but under dynamic conditions pumps a limited flow of hydraulic fluid into the vacuum pump as will be described in more detail later. The hydraulic fluid delivered to the vacuum pump gradually passes through the clearances between the moving parts and is finally discharged through the discharge line 34 back into the reservoir 18 so that there is no permanent loss of steering fluid from the steering system.

Describing now the details of the tandem vacuum pump addition, only two of the components in the power steering pump are significantly affected by the addition of the vacuum pump (see FIGS. 1 and 2). Firstly, the drive shaft 12 is provided with an extension 48 having serrations 50 to engage serrations in the vacuum pump rotor 52 to effect the drive thereto. Secondly, the thrust plate 54 for the power steering pump is made thicker with its rear face 56 then ported as a plate face for the vacuum pump and also provided wit a counterbore 58 into which the lip-type seal 44 is pressed.

The vacuum pump 28 in addition to the rotor 52 and shared thrust plate 54, has vanes 60 and a cam pump ring 62 with the same general shape as that in the rotating group in the power steering pump 10 (see FIGS. 1, 3 and 4).

The vacuum pump ring 62 mates with the rear face of the thrust plate 54 and the rotor 52 fits inside it and over the extension 48 of the shaft 12. An inlet-discharge plate 64 abuts the rear face of the vacuum pump ring 62 and is the rear closure for the vacuum pumping group. The multiple vanes 60 slide in radially extending slots in the rotor to contact the inner contour of the cam pump ring 62 and the vacuum pump is balanced like the power steering pump with two intake ports 65 and two discharge ports 66 in the inlet-discharge plate 64 (see FIGS. 1 and 4 where one of each appears respectively) and equal and opposite fluid forces in the rotating group act radially on the shaft 12. Preferably, the rotor 52, vanes 60, pump ring 62 and inlet-discharge plate 64 are all sintered metal parts. A rubber gasket 68 seals between the rear face of the inlet-discharge plate 64 and the inner face of a molded plastic housing 70 which is of cup-shape and surrounds the balance of the vane-type vacuum pump components. The open end of the housing 70 slides over the thrust plate 54 and a rubber O-ring seal 72 seals therebetween to prevent external loss of fluid.

Two hex-head bolts 76 hold the entire vacuum pump package together with the underside of the bolt heads bearing on the outer face of the housing 70 (see FIGS. 1 and 2). A shoulder 78 on the bolts abuts against the inlet-discharge plate 64 and the axial length of the shoulder limits the amount of sealing compression of the rubber gasket 68 so that axial tension in the bolt is also taken through the metal inlet-discharge plate 64 and the vacuum pump ring 62 and not through the plastic housing 70 which would otherwise experience a flow of the plastic under the bolt load. The diameter of the bolt shank 80 is also controlled in size so as to be a close fit in the holes in the inlet-discharge plate 64 and the pump ring 62 through which the bolts pass. The threaded end of the bolts 76 engage threads in the thrust plate 54 and the shank diameter also pilots in the counterbore before the threads in the thrust plate to further provide alignment of the vacuum pump components. By this technique, the bolts serve to pull all the parts together axially and align them thereby eliminating the need for dowel pins. A flange 82 on the plastic housing 70 provides stiffness but is kept low enough that the retaining ring 84 for the thrust plate 54 can slip freely between the flange and the housing bore at final pump assembly.

Inlet and outlet nipples 88 and 90 for the vacuum inlet and outlet hoses 30 and 34 are molded integral with the plastic housing 70 with the axes of these nipples positioned parallel so that they can be made with a single core slide in the mold to minimize tooling cost and complexity (see FIG. 2). However, it will be understood that the nipples could also project from the housing in non-parallel positions but multiple core slides would then be required.

The air that is drawn in from the vacuum brake booster 32 through the hose 30 and nipple 88 enters a central cavity 92 between the inlet-discharge plate 64 and the housing 70 and then passes through the inlet ports 65 in the inlet-discharge plate to the pumping cavities in the rotating group. Up to this point, vacuum conditions prevail on the inlet side of the vacuum pump. As the pumping cavities traverse the falling portions of the cam contour in the pump ring 62, air is displaced out through the discharge ports 66 in the inlet-discharge plate into a cavity 100 between the inlet-discharge plate and the housing 70. From this point the air passes through the discharge nipple 90 and hose 34 to the reservoir 18 as described earlier. Then it will also be noted that the gasket 68 thus seals the central vacuum pump cavity 92 off from the discharge cavity 100 and also prevents any leakage out past the bolts 76. On the other hand, the O-ring seal 72 prevents the discharge cavity 100 from leaking externally.

As explained earlier, it is necessary to maintain a lubricant film between the mating surfaces and the vacuum pump to prevent wear in the rotating group and also to provide vacuum sealing. The source of this oil is the central core cavity 40 in the hydraulic pump which is normally filled with oil by leakage past the rotor and vanes in the rotating group and by its communication via hole 42 with the hydraulic pump inlet but is now contained on the inboard side of the lip-type seal 44. The seal 44 as best seen in FIGS. 6 and 7 is of the hydrodynamic or helixseal type such as disclosed in U.S. Pat. No. 3,534,960 assigned to the assignee of the present invention and which is incorporated by reference. However, the seal is modified and utilized in a special manner. Normally, such hydrodynamic seals are biased by a spring 101 and typically ride on a film of oil and have their helical ribs so oriented that the oil is pumped back inward from their lip 102. The intent here, however, is to use the seal 44 as a pump to lubricate the vacuum pump 28. To this end, the orientation of the helical ribs 104 on the seal 44 is reversed so that under dynamic conditions, a known and predetermined amount of fluid is pumped from the core cavity 40 of the power steering pump into the rotating group of the vacuum pump from whence it is carried via the discharge air back to the hydraulic pump reservoir 18 so that no loss of hydraulic fluid from the hydraulic system is experienced. Conversely, when the engine is not running and the vehicle is parked, the reverse helixseal 44 has static lip contact at 102 all around the shaft 12 to prevent the fluid in the hydraulic system from draining into the vacuum brake lines or booster during static conditions. A one-way check valve 106 is shown installed in the vacuum pump inlet line 30 but is optional and provides assurance that if the seal 44 should leak statically, the one-way check valve would then prevent the vacuum brake booster and/or other vacuum assisted device(s) from filling with hydraulic fluid.

Thus it will be seen that among the several features and advantages, the combined assembly and particularly the vacuum unit is compact in size with both a small diameter and short axial length. Moreover, there is ease of packaging the unit on the engine as the above unit will readily fit into the space normally occupied by current power steering pumps alone and does not require additional pulleys in an already crowded accessory belt drive train. Furthermore, because the vacuum pump is driven off the steering pump shaft, it does not incur the belt losses experienced with a separate belt driven vacuum pump. Also, its displacement may be readily down sized to suit only what is required to make up for loss of vacuum and therefore need not generate a large surplus. In addition, there is ease of manufacture particularly as to the thrust plate which may be double-disc ground. Moreover, the vacuum pump ring, rotor and vanes are all sintered metal and thus require minimal machining for close-fitting surfaces. Furthermore, the inlet-discharge plate is well suited to current production process methods and equipment while the molded plastic housing is well within the state of current molding art. Moreover, the vacuum pump and thrust plate can be function tested as a subassembly and only after it is known to be satisfactory it can be then assembled into the hydraulic pump for final pump function testing. Also, the use of sintered metals, minimal machining of components, the use of plastic in the housing and the use of some existing hydraulic pump components for dual purpose all combine to minimize the overall cost of adding the vacuum pump.

The above described preferred embodiment is thus illustrative of the invention which may be modified within the scope of the appended claims.

The embodiments of the invention in which an exclusive property or privilege is claimed are defined as follows:

1. In a combined power steering pump and vacuum pump assembly for an automotive vehicle wherein the pumps are arranged in tandem and driven by a common shaft and wherein the power steering pump is adapted to circulate hydraulic fluid in a power steering system while the vacuum pump is adapted to draw and discharge air to create a vacuum to operate one or more devices in the vehicle, an improved lubrication system comprising a vented reservoir connected to receive the discharge of the vacuum pump as well as supply the fluid for circulation by and lubrication of the power steering pump, and hydrodynamic seal means for sealing the vacuum pump from the power steering pump at the periphery of the shaft when the pumps are stopped and providing limited delivery of the fluid from the power steering pump to the vacuum pump axially along the periphery of the shaft when the pumps are running whereby the fluid in the power steering system is prevented from draining into the vacuum pump when stopped and is delivered thereto when running to lubricate same and is thence delivered with the discharge air to the reservoir so that there is no loss of the fluid from the power steering system in lubricating the vacuum pump.

2. In a combined power steering pump and vacuum pump assembly for an automotive vehicle wherein the pumps are arranged in tandem and driven by a common shaft and wherein the power steering pump is adapted to circulate hydraulic fluid in a power steering system while the vacuum pump is adapted to draw and discharge air to create a vacuum to operate one or more devices in the vehicle, an improved lubrication system comprising a vented reservoir connected to receive the discharge of the vacuum pump as well as supply the fluid for circulation by and lubrication of the power steering pump, and hydrodynamic lip-type seal means with reverse oriented helical ribs for sealing the vacuum pump from the power steering pump when the pumps are stopped and providing limited delivery of the fluid from the power steering pump to the vacuum pump when the pumps are running whereby the fluid in the power steering system is prevented from draining into the vacuum pump when stopped and is delivered thereto when running to lubricate same and is thence delivered with the discharge air to the reservoir so that there is no loss of the fluid from the power steering system in lubricating the vacuum pump.

* * * * *